Figure 1:
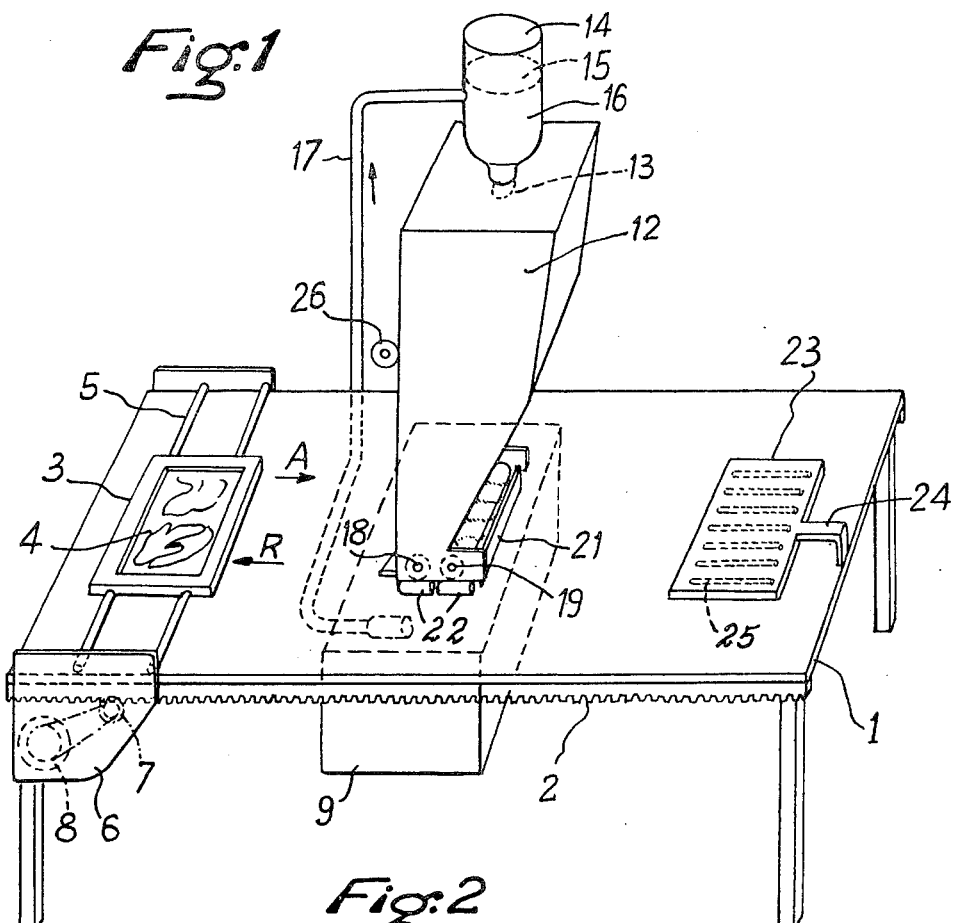

United States Patent [19]
Bichet

[11] 4,011,036
[45] Mar. 8, 1977

[54] MOLDING APPARATUS WITH MATERIAL SMOOTHING MEANS AND RECYCLING MEANS

[75] Inventor: Lucien Bichet, Draveil, France

[73] Assignee: Societe Immobiliere et Financiere Suchet Alfort S.I.F.S.A., Paris, France

[22] Filed: Aug. 28, 1974

[21] Appl. No.: 501,031

[30] Foreign Application Priority Data

Sept. 7, 1973    France .................................. 73.32297

[52] U.S. Cl. .............................. 425/217; 425/218; 425/447
[51] Int. Cl.² ......................................... B29C 29/00
[58] Field of Search .......... 425/215, 216, 217, 218, 425/219, 220, DIG. 20, 447, 448, 261

[56] References Cited
UNITED STATES PATENTS

| | | | |
|---|---|---|---|
| 78,747 | 6/1868 | Johnson | 425/215 |
| 1,028,930 | 6/1912 | Cameron | 425/220 |
| 2,407,514 | 9/1946 | Rembert | 425/218 |
| 2,413,735 | 1/1947 | Shabaker | 425/218 |
| 2,699,590 | 1/1955 | Respess et al. | 425/255 |
| 2,912,717 | 11/1959 | Yarrison et al. | 425/220 |
| 3,377,652 | 4/1968 | Politzer et al. | 425/220 |

FOREIGN PATENTS OR APPLICATIONS

| | | | |
|---|---|---|---|
| 88,537 | 2/1960 | Denmark | 425/447 |
| 526,946 | 4/1927 | Germany | 425/447 |

Primary Examiner—Robert L. Spicer, Jr.
Attorney, Agent, or Firm—Browdy and Neimark

[57] ABSTRACT

An apparatus for filling the cavities of a mold with powdered plastic material and for preliminary gelation of the material is used primarily for making synthetic shoe uppers. A carriage carries a mold beneath a distributor for depositing powdered material in the mold. A leveling means then levels the material at the top of the mold and the excess powder is returned to the distributor. The filled and leveled mold is then passed beneath a heat generator for effecting preliminary gelation of the powdered material.

8 Claims, 4 Drawing Figures

MOLDING APPARATUS WITH MATERIAL SMOOTHING MEANS AND RECYCLING MEANS

The present invention relates to the filling of the hollow parts or cavities of a mold with powdered plastics material and preliminary gelation of said material in the mold. It relates more particularly to the continuous production of pre-forms or preliminary shapes made of plastics material, which have the design outline of the cavities of a mold and are intended for the manufacture of shoe vamps and uppers.

A known process for obtaining the constituent parts of shoe uppers made of synthetic material comprises filling the hollow parts or cavities of a mold, which is the negative of the design to be reproduced for the shoe upper, with powdered plastics material, such as powdered polyvinyl chloride. A material which will constitute the lining of the shoe upper, for example, leather, is then applied onto the filled mold, and the sandwiched unit is heated by high frequency heating, under pressure. A cooling operation then permits immediate removal from the mold of the piece formed by the lining laminated to the plastics material which corresponds to the outline of the mold cavity. This technique has already been described in British Patent Specification No. 1,323,592.

The operation, described above in principle, may involve a preliminary gelation phase, by means of heating the powdered substance, after the mold has been filled and before the compression phase, by a frequency heating operation. Furthermore, spreading the plastics material powder in a regular and uniform layer over the design in the cavity of the mold which is made of a synthetic elastomer, such as silicone rubber, requires particular care and thus necessitates a manual operation.

According to one aspect of the present invention, there is provided a method for continuous production of powder gelled in one or more cavities of a mold, for the purpose of manufacturing the constituent parts of shoe uppers made of synthetic material, in which, in the course of continuous displacement of the mold, the operations of depositing and levelling the powder over the surface of mold cavity surface, and subsequent preliminary gelation of the powder thus formed are successively carried out, the mold then being brought back to its initial position.

According to another aspect of the invention there is provided apparatus for filling one or more cavities of a mold with powdered plastics material and for preliminary gelation of said material in the mold for the purpose of manufacturing the constituent parts of shoe uppers, the apparatus comprising, disposed in series along a horizontal support, (a) means for displacement of the mold in the directions of advance and return movement, (b) a dispensing -distributor for powder in the designs in the cavities of the mold, (c) heating means, which effects preliminary gelation of the powder and (d) control means for said mold displacement means, said heating means and said dispenser-distributor.

The invention also includes articles made by said method.

In preferred embodiments, these preliminary stages of spreading the powder evenly on the desired parts of the mold, and subsequent partial gelation of the powder, are combined and carried out continuously, giving excellent results with the aid of an automatic high speed mechanism, which can be operated either independently or serially in a production cycle for synthetic vamps of shoes from a mold with pre-determined designs.

The displacement means for the mold can be constituted by a horizontal plate, functioning as a transport carriage which is disposed over the length of an apparatus support stand, on which the elastomer mold is disposed, comprising the designs in the cavity which are to be reproduced on the preliminary shape for the shoe upper.

The horizontal plate can be solid or, according to one modification, can have the form of a metal grill on which the elastomer mold is disposed so as to be level. It can also consist of a plate equipped with small perforations. In the last two embodiments described above, the mold can either simply be placed on the perforated plate or the grill, or is firmly secured on these support members by suction nozzles disposed below said supports and connected to a slight vacuum.

The adoption of a grill or perforated plate as a mobile support for the mold permits a saving of material for production of the mold, which can be directly contoured to the shape of the article to be attained without the grill or plate needing to be totally covered (contrary to a solid plate). Furthermore, excess powder which may be obtained at the time of the distribution phase can be more easily recovered in the course of operation.

The positioning and removal of the mold on the plate or grill can be carried out either by a manual operation or in a semi-automatic manner or even fully automatic manner. For this purpose the mold carrying plate can be provided with pegs controlled by jacks, which permit the mold to be kept in position during the operation and then to release it after gelation. Furthermore, a system which is automatically controlled by jacks disposed along the length of the support, can enable the mold to be ejected from its support as soon as the preliminary gelling operation is finished.

The distribution member for the plastic material for example consists of an apparatus comprising: a receptacle bin for the powder disposed below the support and, above this member, a powder distribution hopper surmounted by an apparatus for re-charging the hopper, provided with a ventilation turbine, said turbine being connected to the bin by a powder suction pipe line.

According to the first embodiment, the powder is maintained in a fluidized state in the storage bin and the distribution hopper is equipped at its base with a cylinder having a horizontal axis perpendicular to the uprights of the apparatus support and which functions as a powder distribution member, a further cylinder adjacent to the first cylinder and carrying combs or brushes which are intended to level the surface of the mold over which the powder is spread, and also at least one scraper member for removing the powder from the parts not forming the mold cavities and with at least one set of lateral brushes which enable excess powder accumulated on the edges of the mold to be removed, by causing it to fall into said bin.

According to a further embodiment, two cylinders located at the base of the hoppers are replaced by a simple trap door mechanism, which permits the desired quantity of powder to be supplied on the cavities of the mold. In this case, fluidization of the powder is carried out directly, not in the bin, but in the lower part of the hopper.

In the two aforementioned embodiments, the powder storage bin, which can advantageously be of conical form, is provided on its upper part with a system which enables excess powder issuing from the dispenser-distributor mechanism to be collected. This system may be either a mesh or grill or a vibratory sifter mechanism which enables any grains or the mass of grains which have not undergone satisfactory preliminary gelation to be separated and exhausted, at the moment when the mold support plate returns to its initial position.

According to one modification, the hopper section of the dispenser-distributor mechanism can be replaced by a mechanism of the electrostatic spray gun or pistol type, and any of the possible attachments such as smoothing brushes and scraper systems as described above can be supplementarily utilized.

The heating means, mounted on one end of the frame, which is opposed to that carrying the carriage with the mold support plate and at a greater height than said member, may be constituted by a horizontal plate, equipped with high intensity heating means on its lower surface, such as: a series of booster lamps or, infra-red or high frequency heating mechanisms. The upper surface of the mechanism is covered with a thermal insulating material, such as asbestos or the like. Furthermore, this mechanism is equipped with mechanisms for regulating the height or intensity of the heating elements and also regulating the heating period, which can be varied according to the type of color utilized for the powder.

An assembly of pneumatic and electric means, in a control box, enables the carriage to be displaced, output and operation of the distributor and its attachments to be controlled and the heating mechanism to be fed by coordination of the respective phases of each element of the apparatus.

Figure 2:
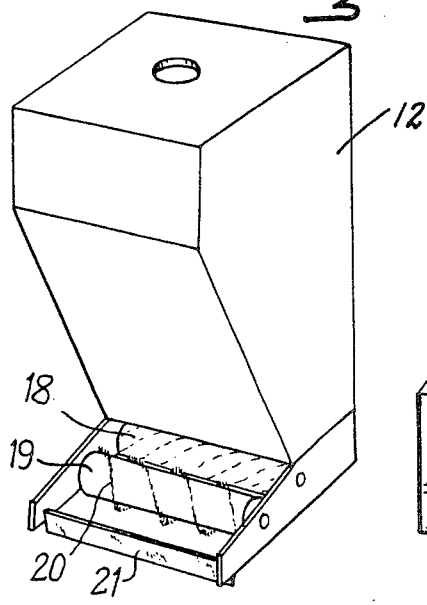
Figure 3:
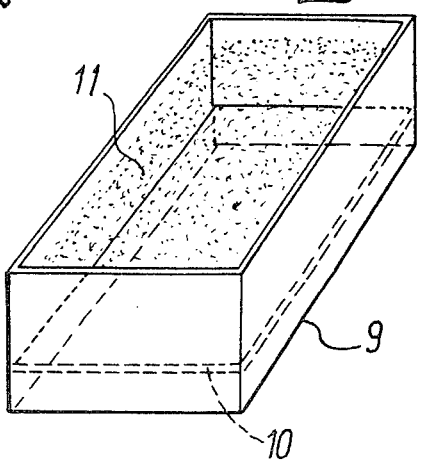
Figure 4:
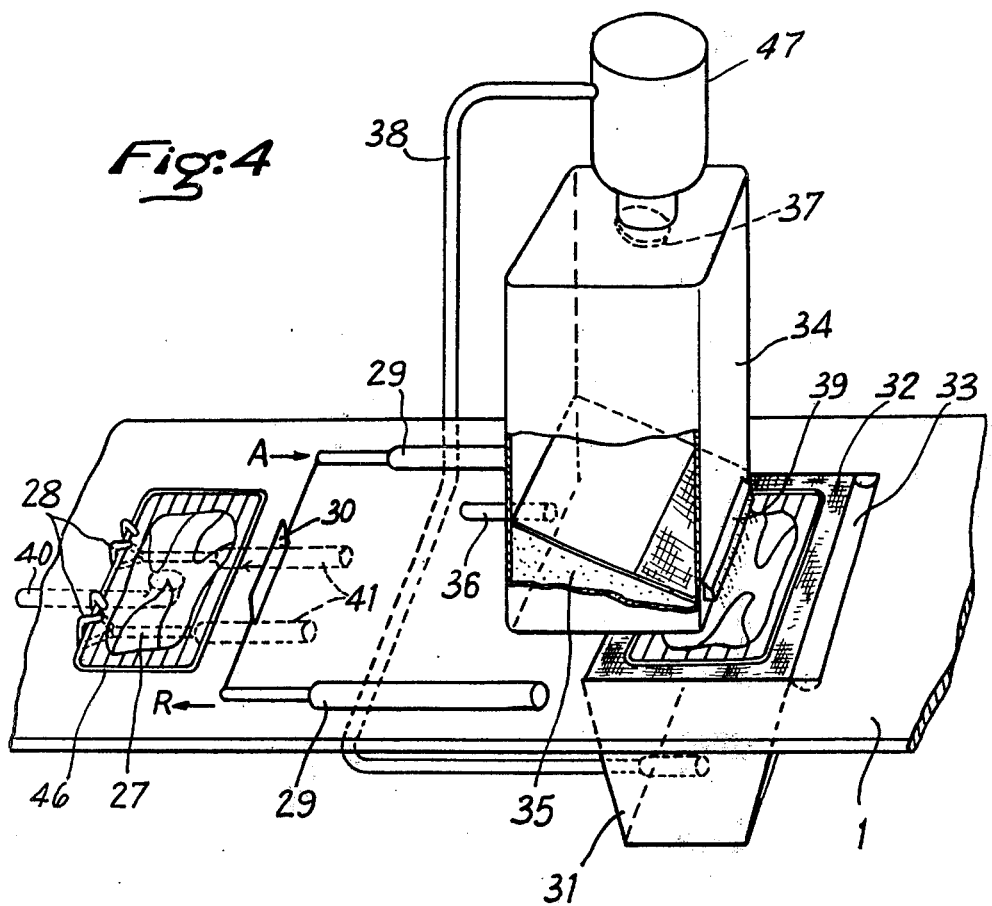

The invention may be performed in various ways and two principal embodiments will now be described by way of example, with reference to the attached drawings, in which:

FIGS. 1, 2 and 3 are diagrammatic views of an apparatus according to the invention, in accordance with a first embodiment wherein the lower part of the powder dispenser-distributor mechanism, FIG. 2, is equipped with powder dispensing and distributing cylinder systems and wherein a storage bin, FIG. 3, contains the powder in the fluidized state; FIG. 1 is an overall view, in elevation, of the apparatus mounted on its frame; and FIG. 4 illustrates a second embodiment showing the modifications relating to the mold support plate, in this case, a grill, and to the dispenser-distributing mechanism, at the base of which the cylinders have been replaced by a powder distribution flap above which the powder is maintained in a fluidized state. In this highly diagrammatic FIG. 4, the stand or frame supporting the apparatus has not been shown, nor the heating mechanism for preliminary gelation of the powder, these elements being actuated and disposed in the same manner as in FIG. 1.

The first arrangement, illustrated by FIGS. 1, 2 and 3, then the second arrangement corresponding to FIG. 4, will be successively described below.

With reference to FIGS. 1, 2 and 3, on the metal stand or frame 1, lateral crossbeams comprise a toothed section 2 for lateral displacement, by means of a roll or pulley, of a carriage, as will be explained later, and there are disposed in succession, proceeding from left to right in FIG. 1: the movable carriage formed by a metal plate 3, on which a mold 4 is disposed and which is connected by means of crossbeams 5, on each side of the frame, to a housing 6 equipped with a drive ring 7 which meshes with the teeth 2 of the frame. Movement of the carriage or mold support plate is controlled by an electric motor 8. The powder dispensing-distributor, which comprises more particularly: a bin 9 in which the powdered plastics material is stored and which is advantageously formed as a double bottomed box, using a plate 10, permeable to air, below which air, under low pressure, for example, 1 kg/cm$^2$, is injected and above which the stored powder 11 is disposed in the fluidized state, in the course of operation of the apparatus; a powder distribution hopper 12, which is in communication through a valve system 13, with a hopper recharging mechanism, formed by a ventilator turbine 14 which is separated from a feed compartment 16 by a filter 15. This mechanism is connected to the bin 9 by a flexible pipe line 17, in such a manner as to suck the powdered material from the bin as far as the compartment 16 and subsequently to the hopper 12. The hopper comprises at its base a cylinder 18, FIG. 2, which is made, for example, of grained or grooved metal and serves, by means of rotation, to distribute the powder 11 on the mold 4, as well as a further rotary cylinder 19, equipped with brooms or combs or brushes 20, which, in the course of operation, eliminate excess powder deposited on the mold, in such a manner as to obtain a uniform depositing surface, only over the cavities of the mold. This surface levelling is completed by the action of at least one scraper member 21, which is also disposed at the base of the hopper. Finally, a series of lateral brushes 22, on each side of the hopper, enables powder disposed on the sides of the mold 4 and plate 3 to be removed, by causing it to fall into the bin 9 where, in the course of operation, it is sucked into the hopper by the turbine 14; a heating means 23 mounted on the frame by means of a tenon or tongue 24 at a point some centimeters higher than the plane of movement of the mold support plate 3. This heating device comprises heating elements, constituted for example by rows of booster lamps 25, capable of supplying a total power within the range of 10 to 15 kilowatts. These lamps may be replaced by infra-red or high frequency heating elements. The upper surface of the heater 23 is thermally insulated, for example, by means of a grill with an asbestos plate. The height of the heating means is adjustable by means of a device of known type, for example, a rack and pinion device.

A speed change device 26 is attached to the hopper and thus permits regulation of the rotary speed of the cylinder 18 and consequently of the delivery and passage time for the powder. Furthermore, a plurality of series of pneumatic means, mounted on the frame, not shown in the drawings, are provided for carrying out operations of the following types: regulation of air in the compartment 10 of the bin 9 for fluidization of the powder; the transport of air from this bin below the hopper 12; and arrangement of the scraper or scrapers 21 for the mold in the highest position, when the mold is returning to its initial position, after preliminary gelation of the powder has taken place below the heating device 23. Finally, a drive and control box, not shown, permits the operator to regulate and vary the parameters of continuous operation for the various members and mechanisms.

In practice, operation of the apparatus according to this first embodiment is carried out in the following manner; the carriage 3 equipped with its mold 4 travels in a continuous manner along the frame 1 in the sense of advance in the direction of the arrow (A). It travels below the powder dispensing-distributor unit without interruption of its movement. As soon as the frontal ridge of the mold arrives at the level of the distributor cylinder 18, a certain quantity of powder is deposited over the entire surface of the mold and its thickness is levelled by the cylinder with brushes 19. A fraction of a second afterwards the powder distributed over the parts of the mold without a cavity is removed with the aid of the scraper or scrapers 21 and, on the lateral surfaces of the mold, with the aid of brushes 22. The carriage, which continues to advance, then travels below the heating elements of the device 23 for preliminary gelation of the grains, the passage time being regulated in the central interval so as to be between 3 and 5 seconds. Then, having arrived at the end of the stroke, still without any interruption of its movement, the carriage returns to its initial position in the direction of the arrow (R); the heating apparatus and distributor are of course, not in operation during this return movement. The total time for the operation varies between 12 and 15 seconds, generally, according to the type of mold, the basic material utilized and the power selected for the gelation mechanism.

The powder utilized as a basic material is initially stored in the bin 9, which also recovers the excess removed by the scrapers 21 and brushes 22, and then, when the powder is in the fluidized state owing to the action of the current of air below the plate 10, it is sucked into the pipe line 17 as far as the mechanisms 16 and 12, which are maintained at a previously regulated level by the valve 13. The mold may be secured on the carriage by means of a suction nozzle 40 connected to a slight vacuum.

With reference to FIG. 4, in this embodiment, modifications relating to the mold support system and to the dispensing-distributor are shown.

The mold support carriage is in this case illustrated in the form of a grill 46 on which the mold 27 rests and which is moved forwards, arrow A, then towards the rear, arrow R, as explained above. This carriage is equipped with a system of pegs or retaining fingers 28, actuated by a jack 41 disposed below the carriage. Furthermore, two jacks 29 disposed over the length of the frame 1 control a thrust finger 30, which is intended to eject the mold from its support when the mold is returning to its initial position, after the gelation phase.

The dispensing-distributor comprises, as explained thereinabove with regard to the first embodiment: a powder storage bin 31, but in this case it is shown in a conical form and is provided with a grill 32 which can be a vibratory sifter mechanism equipped with a trough 33 for recovery of the mass of gelled powder grains; and a powder distribution hopper 34, at the base of which a compartment 35 contains the powder in the fluidized state owing to the delivery of air conveyed by the pipe line 36. The hopper is connected, as mentioned above, to a ventilator turbine 47, which communicates with hopper 34 by means of a valve 37 and receives the powder from the storage bin 31 via pipe line 38. The hopper delivers the powder in dosed quantities via a trap door 39, distribution of the powder and the removal of any excess being obtained by a mechanism comprising scrapers and brushes (not shown) in the same manner as in FIGS. 1 and 2. The powder excess falls into the bin 31, from where it is brought back into the turbine 47. In a further embodiment, the hopper of the dispensing-distributor is of the electrostatic spray gun type, not shown in the drawings, but well known per se.

The method of operation and automatic control system for the members of this embodiment are the same as those already described with reference to FIGS. 1, 2 and 3.

The apparatus according to the different embodiments described above can be utilized with all types of mold comprising the most various designs in the cavity. It is particularly advantageous, even if these cavities comprise several levels, for the purpose of obtaining vamp pieces of a structure comprising a series of reliefs. Furthermore, any type of powdered plastics material, which is suitably fed and colored, can in principle be utilized. Particularly advantageous, however, is powdered polyvinyl chloride as generally utilized for the production of shoe vamps and uppers by means of the molding and high frequency method described in the above-mentioned specification.

Although the continuously operating apparatus has been described above for a transfer operation and for preliminary gelation of powder in the cavities of a mold, strictly speaking independently of the operation for the manufacture of uppers referred to in the preamble of this text, the scope of the invention covers an uninterrupted chain of production for the manufacture of said uppers, proceeding from a predetermined mold, wherein the mold support carriage, instead of immediately returning to its initial position after gelation of the powder, moves along a subsequent molding line by means of pressure whilst subjected to a high frequency electric current and then removal from the mold, so as to directly obtain vamp pieces made of synthetic material. After the vamp pieces have been removed from the mold, the mold is returned to its initial position for second and subsequent cycles.

I claim:

1. Apparatus for filling one or more cavities of a synthetic elastomeric mold with powdered plastic material and for preliminary gelation of said material, comprising:
   a distributor means for depositing powdered material in the mold;
   leveling means for leveling with the top of the mold the powdered material deposited in the mold by said distributor means;
   a heat generator for effecting preliminary gelation of the leveled powdered material deposited in the mold, said heat generator comprising a horizontal plate, equipped on its lower surface with high intensity heating means;
   a horizontally supported frame along which are disposed in series said distributor means, said leveling means and said heat generator;
   carriage means, horizontally reciprocably movable along said frame, for reciprocably moving the mold from an initial position to said distributor means, from thence past said leveling means to said heat generator, and then back to the initial position, said carriage means comprising a perforated plate or grill on which the mold can be carried so as to be level, said perforated plate or grill having a surface area greater than that of the mold in contact therewith, whereby the mold does not totally cover said perforated plate or grill; and return means for returning the excess powder after said leveling means to said distributor means, said return means including a holding bin below the level of said carriage means and substantially disposed beneath said distributor means and said leveling means, said holding bin having a sifting means at the entrance thereto, below the level of said carriage means, for separating non-powder masses from the powder.

2. An apparatus in accordance with claim 1, wherein said high intensity heating means comprises a series of booster lamps.

3. An apparatus in accordance with claim 1, including means for providing a slight vacuum in holding said mold on said plate or grill.

4. An apparatus in accordance with claim 1, further including pegs for maintaining said mold on said plate or grill and automatic ejection means for ejecting the mold from the plate after the preliminary gelation operation.

5. An apparatus in accordance with claim 1, wherein said distribution means comprises:
   a powder distribution hopper above the level of said carriage means; and
   a horizontal rotary powder cylinder at the base of said hopper;
   and wherein said return means further includes a powder recharging mechanism, equipped with a ventilator turbine, surmounting said hopper and connected to said holding bin by a powder suction pipe.

6. An apparatus in accordance with claim 5, wherein said leveling means comprises a further cylinder at the base of said hopper and adjacent said powder distribution cylinder, said further cylinder carrying combs or brushes so as to level the surface over which the powder is spread on the mold, at least one scraping member for completing the leveling and at least one set of lateral brushes for removing excess powder which may have accummulated on the edges of the mold.

7. An apparatus in accordance with claim 1, wherein said distribution means comprises:
   a powder distribution hopper above the level of said carriage means;
   a compartment at the base of said hopper;
   fluidizing means for fluidizing the powder in said compartment; and
   trap door means connected to said compartment for directly pouring dosed quantities of powder into the mold;
   and wherein said return means further includes a powder recharging mechanism, equipped with a ventilator turbine, surmounting said hopper and connected to said holding bin by a powder suction pipe.

8. An apparatus in accordance with claim 7, wherein said leveling means comprises at least one scraper member for removing excess powder from the surface of the mold and at least one set of lateral brushes for removing excess powder accumulated on the edges of the mold.

* * * * *